US012398866B2

(12) United States Patent
Parish

(10) Patent No.: US 12,398,866 B2
(45) Date of Patent: Aug. 26, 2025

(54) ASSEMBLY FOR CANTILEVERED ARM LIGHT STABILIZATION AND MOBILITY

(71) Applicant: Edwin Parish, Wichita, KS (US)

(72) Inventor: Edwin Parish, Wichita, KS (US)

( * ) Notice: Subject to any disclaimer, the term of this patent is extended or adjusted under 35 U.S.C. 154(b) by 6 days.

(21) Appl. No.: 18/378,355

(22) Filed: Oct. 10, 2023

(65) Prior Publication Data

US 2024/0085003 A1 Mar. 14, 2024

Related U.S. Application Data

(60) Provisional application No. 63/420,204, filed on Oct. 28, 2022.

(51) Int. Cl.
*F21V 21/06* (2006.01)
*F21V 21/14* (2006.01)

(52) U.S. Cl.
CPC .............. *F21V 21/06* (2013.01); *F21V 21/14* (2013.01)

(58) Field of Classification Search
CPC ........... F21V 21/06; F21V 21/14; F21L 14/04
See application file for complete search history.

(56) References Cited

U.S. PATENT DOCUMENTS

| | | | | |
|---|---|---|---|---|
| 5,716,126 A * | 2/1998 | Meyer | F21V 21/14 | 362/418 |
| D405,204 S * | 2/1999 | McAdams | D26/63 | |
| 6,019,484 A * | 2/2000 | Seyler | F21V 21/22 | 362/403 |
| 7,073,926 B1 * | 7/2006 | Kremers | F21V 21/22 | 362/427 |
| 10,082,281 B1 * | 9/2018 | Liao | F21S 6/005 | |
| 10,436,426 B2 * | 10/2019 | Thomas | F21L 14/04 | |
| 2008/0224016 A1 * | 9/2008 | Defu | E04H 12/2246 | 248/523 |
| 2015/0330613 A1 * | 11/2015 | Louden | F21V 23/02 | 29/592 |
| 2017/0009941 A1 * | 1/2017 | Chen | F21V 23/06 | |

* cited by examiner

*Primary Examiner* — Tsion Tumebo
(74) *Attorney, Agent, or Firm* — Kenneth Jack; Davis & Jack, LLC

(57) ABSTRACT

A lighting assembly incorporating a "V" base having left and right arms forming a vertex; a column extending upwardly from the vertex; an upper arm fixedly attached to and cantilevering forwardly from an upper end of the column; an electric light fixedly attached to a forward end of the upper arm; a support plate fixedly mounted over the vertex; a column fixedly attached to the support plate; and a vertical stack of stabilization weights overlying the support plate.

12 Claims, 8 Drawing Sheets

ASSEMBLY FOR CANTILEVERED ARM LIGHT STABILIZATION AND MOBILITY

REFERENCE TO RELATED APPLICATIONS

This non-provisional patent application claims the benefit of and priority from U.S. Provisional Patent Application No. 63/420,204 filed Oct. 28, 2022. The inventor disclosed in said provisional application is the same person as the person who is disclosed as the inventor in the instant application. The applicant asserts that structures and functions of structures disclosed and described in the instant application are substantially identical to those disclosed in said provisional application.

BACKGROUND OF THE INVENTION

Electric cantilevering arm supported lights which support an electric light at the distal end of a raised and extended arm are known to support such arm and light at the upper end of a support column. The lower ends of such columns are known to be supported by a base. As a result of such cantilevering extensions of such upper arms, such cantilevering arm adapted lights are known to present risks of falling or toppling either forwardly toward the extension of the cantilevering arm, or leftwardly or rightwardly. The instant invention provides specialized adaptations and components which dually or simultaneously function for resisting and protecting against cantilevering arm light toppling, while providing a rolling mobility capability.

OBJECT AND SUMMARY OF THE INVENTION

A first structural component of the instant inventive assembly for cantilevering arm light stabilization and mobility comprises a base which is preferably composed of square metal tubing. In a preferred embodiment, the base component forms a "V" configuration or "V" base whose arms respectively extend rightwardly and forwardly and leftwardly and forwardly.

A further structural component of the instant inventive assembly comprises a base plate or support plate which is fixedly mounted over the vertex of the "V" configured base. A forward end or aspect of the base plate preferably functions as a column mounting site, while portions of the upper surface of the base plate which are not occupied by column function as a stabilization weight supporting surface. In a preferred embodiment, the base plate is circular.

Further structural components of the instant inventive assembly comprise a vertically extending support column whose lower end is fixedly attached to the base plate. A proximal end of a cantilevering arm is preferably fixedly attached to the upper end of the support column so that such arm extends forwardly from the column. At electric light such as an LED light, incandescent light, or fluorescent light is supported at the distal end of the cantilevering arm.

Further structural components of the instant inventive assembly comprise at least a pair of, and preferably a triple of stabilization plates, such pair of plates being attached to the distal ends of the V's base's left and right arms. In the preferred embodiment, a third stabilization plate underlies the "V" base's vertex. Such stabilization plates may function as foot plates for supporting the "V" base or, alternatively, as mounting lands for attachment of a triple of roller casters.

Further structural components of the instant inventive assembly comprise a plurality of counter-balancing weights or stabilization weights which are vertically stacked upon the base plate. A retention lug or pin is preferably fixedly attached to and extends upwardly from a rearward end of the support plate's upper surface. Each of the counter-balancing weights includes a vertically extending pin receiving eye which is positioned for, upon a placement of the counter-balancing weight upon the support plate with its pin receiving eye in alignment with the pin, the pin may advantageously retain the counter-balancing weight at its stacked position overlying the support plate.

In operation of the instant inventive assembly, the upwardly extending component pin securely holds the counter-balancing weights at their stacked positions upon the circular base plate or support plate, advantageously preventing any accidental rearward displacements of the weights. Accordingly, such pin, in combination with the weights' eyes, advantageously performs a function of resisting forward toppling of the light assembly by assuring proper positioning of the counter-balancing weights.

Also in operation of the instant invention, and while the roller casters are removed, the stabilizing foot plates may advantageously perform functions of resisting lateral or leftward and rightward toppling motions of the light assembly. Such stabilizing foot plates advantageously dually or additionally function as mounting surfaces for attachments of the roller casters for purposes of enhanced mobility of the light assembly.

Accordingly, objects of the instant invention include the provision of an assembly for cantilevering light stabilization and mobility which incorporates structures as described above, and which arranges those structures in relation to each other in manners described above for the performance of beneficial functions described above.

Other and further objects, benefits, and advantages of the instant invention will become known to those skilled in the art upon review of the Detailed Description which follows, and upon review of the appended drawings.

FIELD OF THE INVENTION

This invention relates to electrical cantilevering arm lights. More particularly, this invention relates to specialized adaptations and assemblies incorporated into cantilevering arm lights which perform functions of stabilizing the light and adapting the light for rolling mobility.

DETAILED DESCRIPTION OF THE INVENTION

Figure 1:
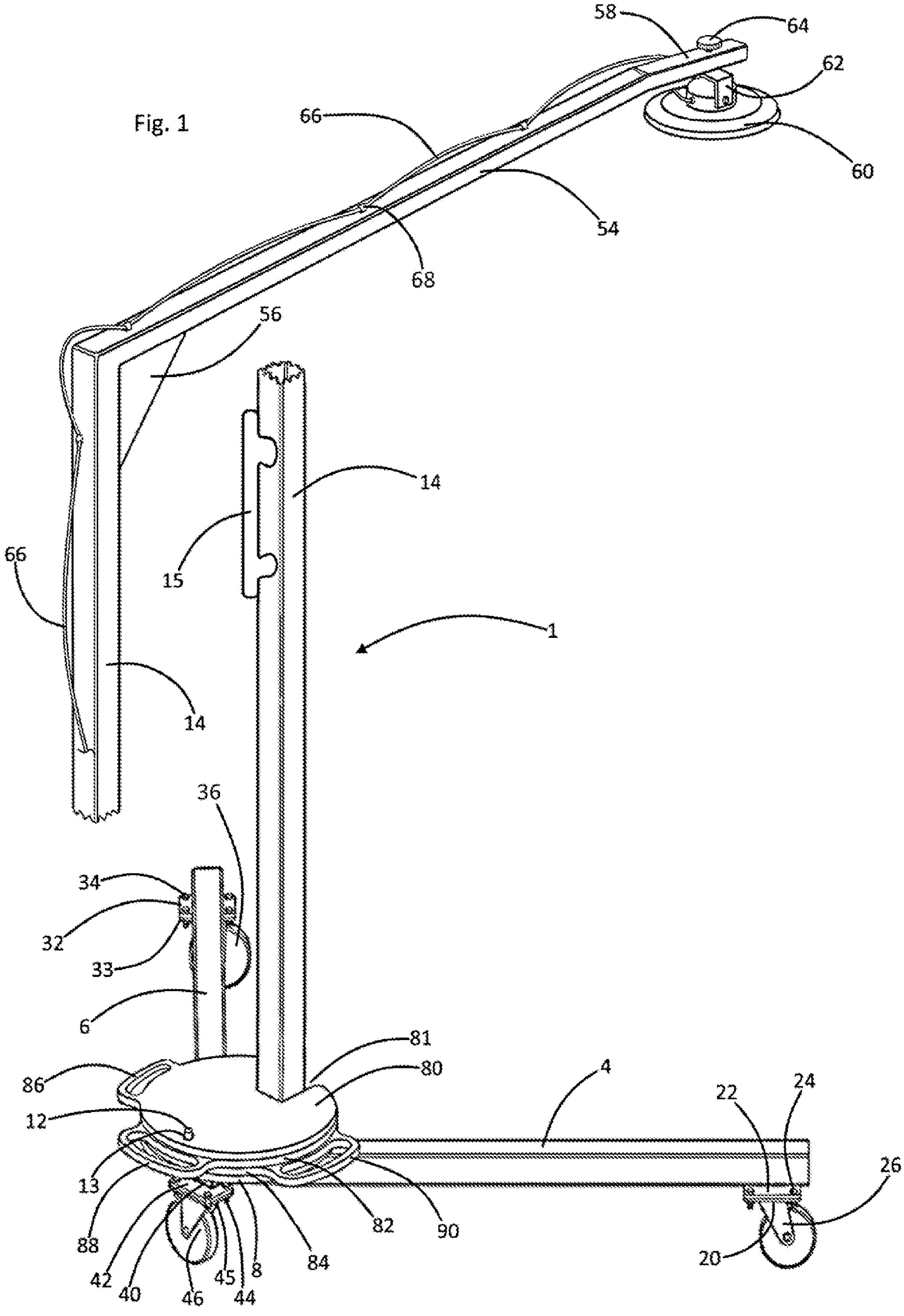
FIG. 1 is a perspective view of the instant inventive assembly for cantilevering light stabilization and mobility, the view showing the assembly in a "cutaway" configuration for compactness of view.
Figure 5:
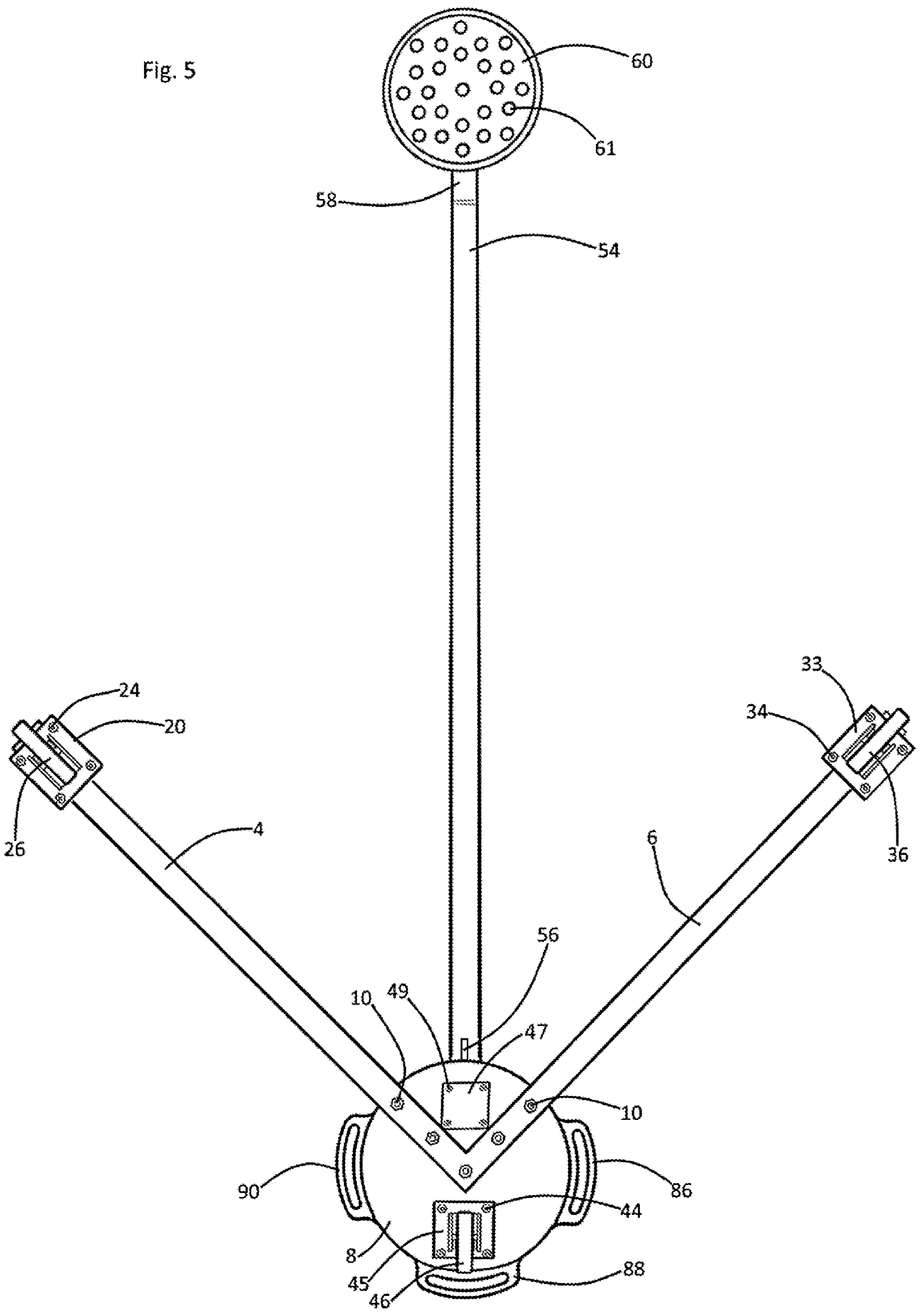
FIG. 5 is a lower view of the structure of FIG. 1.

Referring now to the drawings and in particular to Drawing FIG. 1, a preferred embodiment of the instant inventive assembly for cantilevering light stabilization and mobility is referred to generally by Reference Arrow 1. Referring simultaneously to FIGS. 1 and 5, a foundational component of the instant inventive assembly comprises a base or foundation structure which is preferably composed of lengths of steel square tubing. As indicated in the drawings, such base may be configured in a "V" formation having right and left arms 4 and 6. For purposes of enhanced structural rigidity, the proximal ends of such "V" arms 4 and 6 may be wholly formed with each other at the vertex of the "V". Suitably, such arms may be alternatively separate. In order to facilitate secure mounts of other assembly structures upon the "V" base 4, 6, a support plate 8 is preferably rigidly bolted to the upper surface of the "V" base 4, 6 at its vertex, such attachment being effected by nut and bolt combination fasteners 10. In the preferred embodiment, the support plate 8 is circularly configured. Suitably, the support plate may be alternatively configured to assume other geometric shapes.

Figure 7:
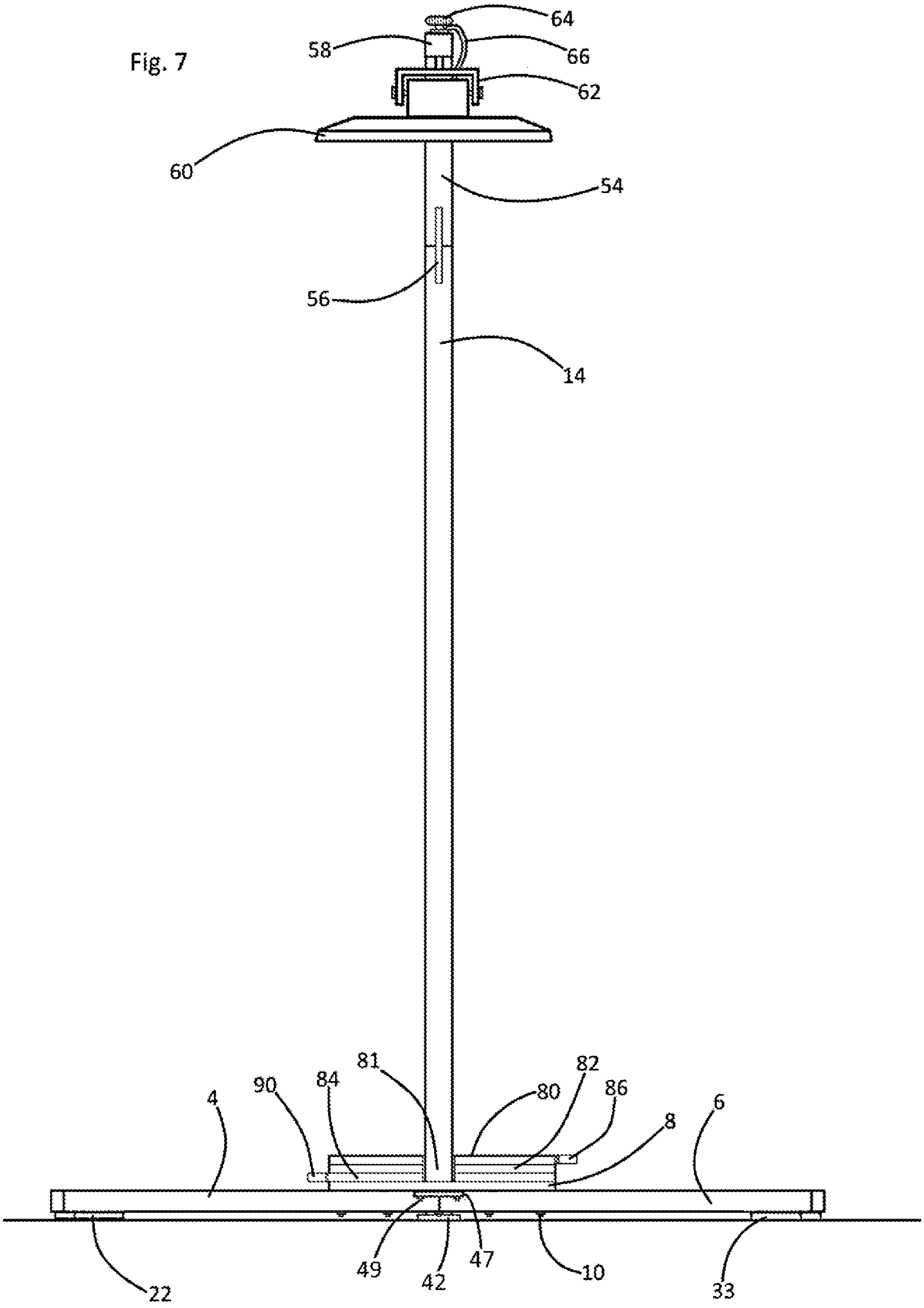
FIG. 7 presents an alternative configuration of the structure of FIG. 4.
Figure 8:
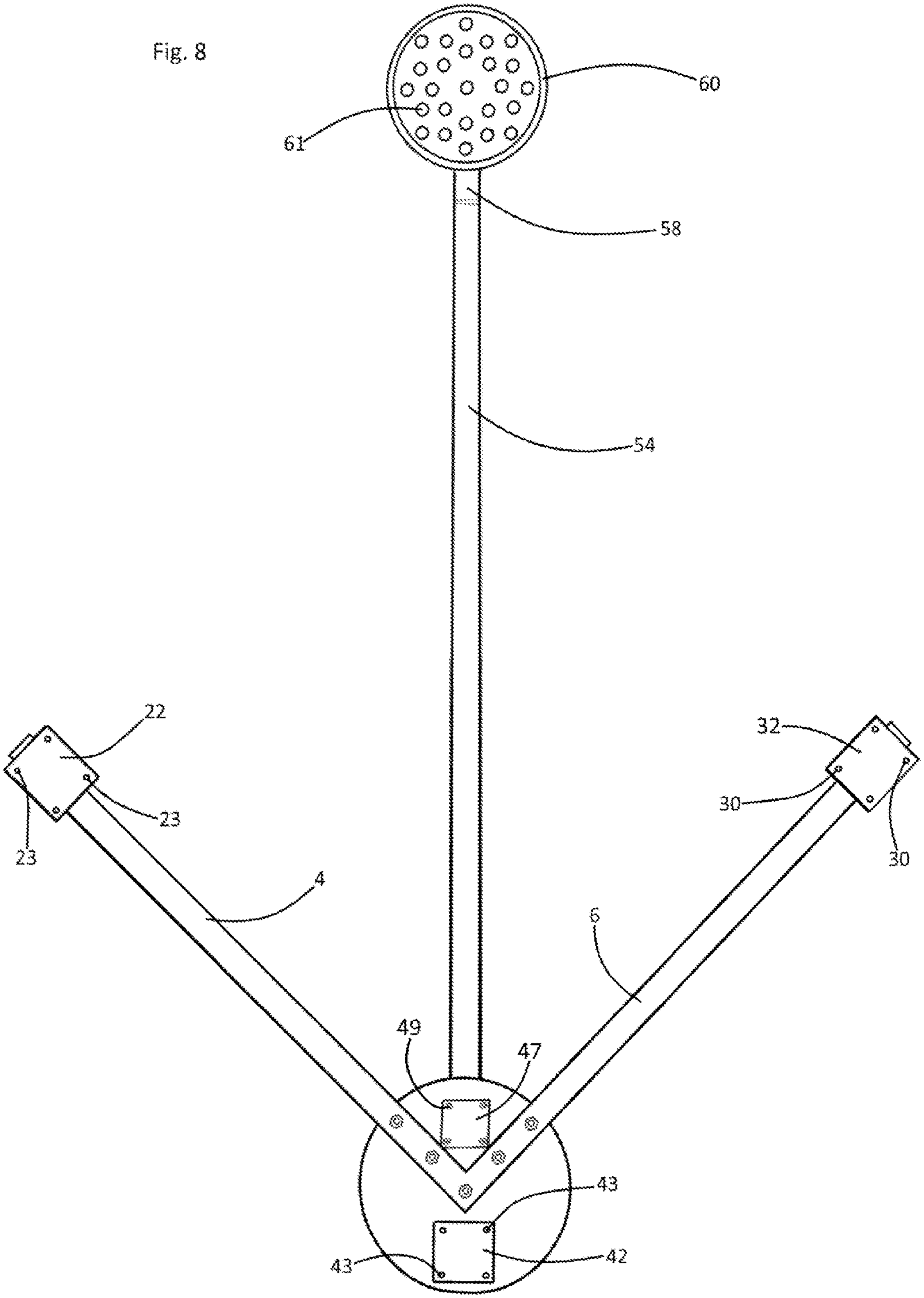
FIG. 8 presents an alternative configuration of the structure of FIG. 5.

Referring simultaneously to FIGS. 1, 7, and 8, a series of stabilization plates 22, 32, 42 are fixedly positioned beneath the "V" base 4, 6. Stabilization plate 22 is preferably fixedly welded to the undersurface of the distal end of the "V" base's right arm 4. Stabilization plate 32 is preferably similarly fixedly welded to the distal end of the undersurface of the "V" base's left arm 6. A mounting extension 40 is preferably fixedly welded to the undersurface of support plate 8 so that the assembly's third stabilization plate 42 may reside at an elevation equal to those of the right and left stabilization plates 22 and 32. In the preferred embodiment, the stabilization plates 22, 32, and 42 respectively include matrixes of mounting eyes 23, 30, and 43. The right stabilization plate 22 contacts a floor surface as indicated in FIG. 7 for enhanced resistance against rightward toppling of the assembly. Stabilization plate 32 similarly resists leftward toppling. Stabilization plate 42 similarly resists rearward toppling.

Figure 2:
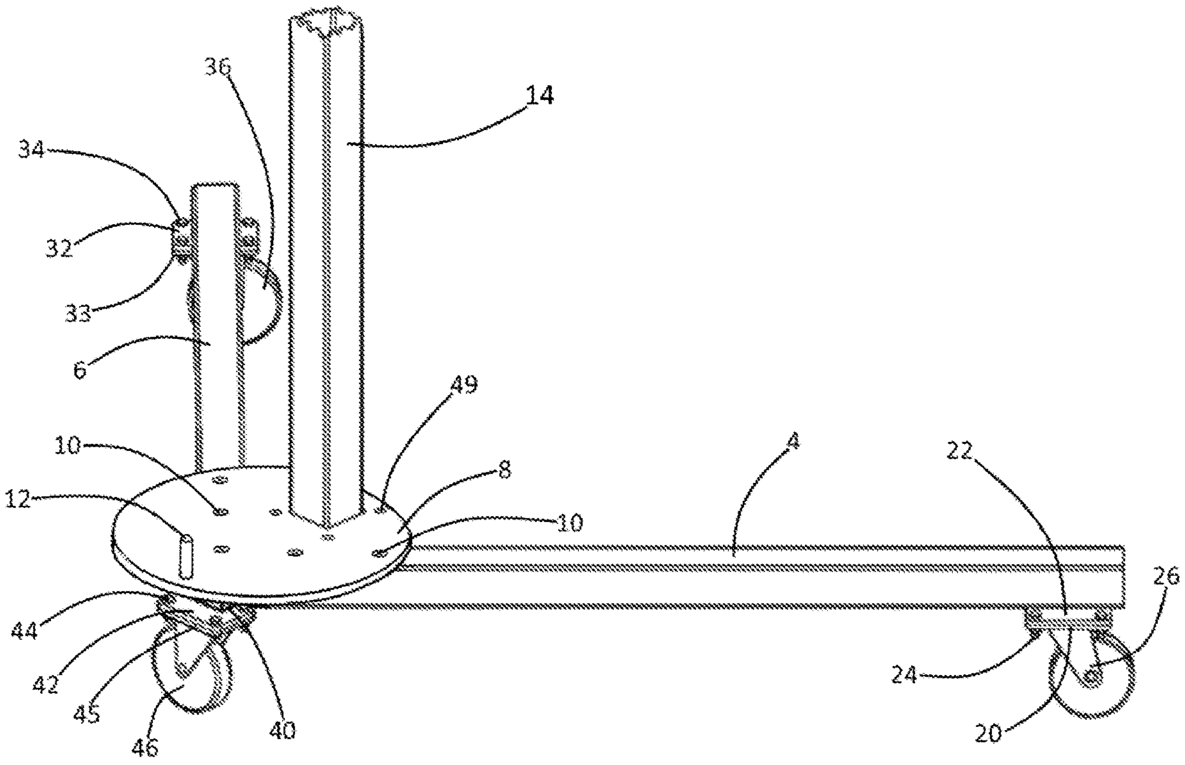
FIG. 2 is a magnified view of a lower portion of the structure of FIG. 1, the view of FIG. 2 showing stabilizing weight components removed.

Referring simultaneously to FIGS. 1, 2, and 8, a vertical support column 14 is preferably fixedly attached to the support plate so that such column 14 extends upwardly from a forward aspect or end of such plate. In a suitable embodiment, the vertical column 14 may be mounted by means of a mounting plate 47 which is secured by a matrix of nut and bolt combination fasteners 49. In the preferred embodiment, the vertical column 14, along with its mounting plate 47 reside within the space upon the support plate 8 which is defined by the vertex of the base 4, 6.

Figure 3:
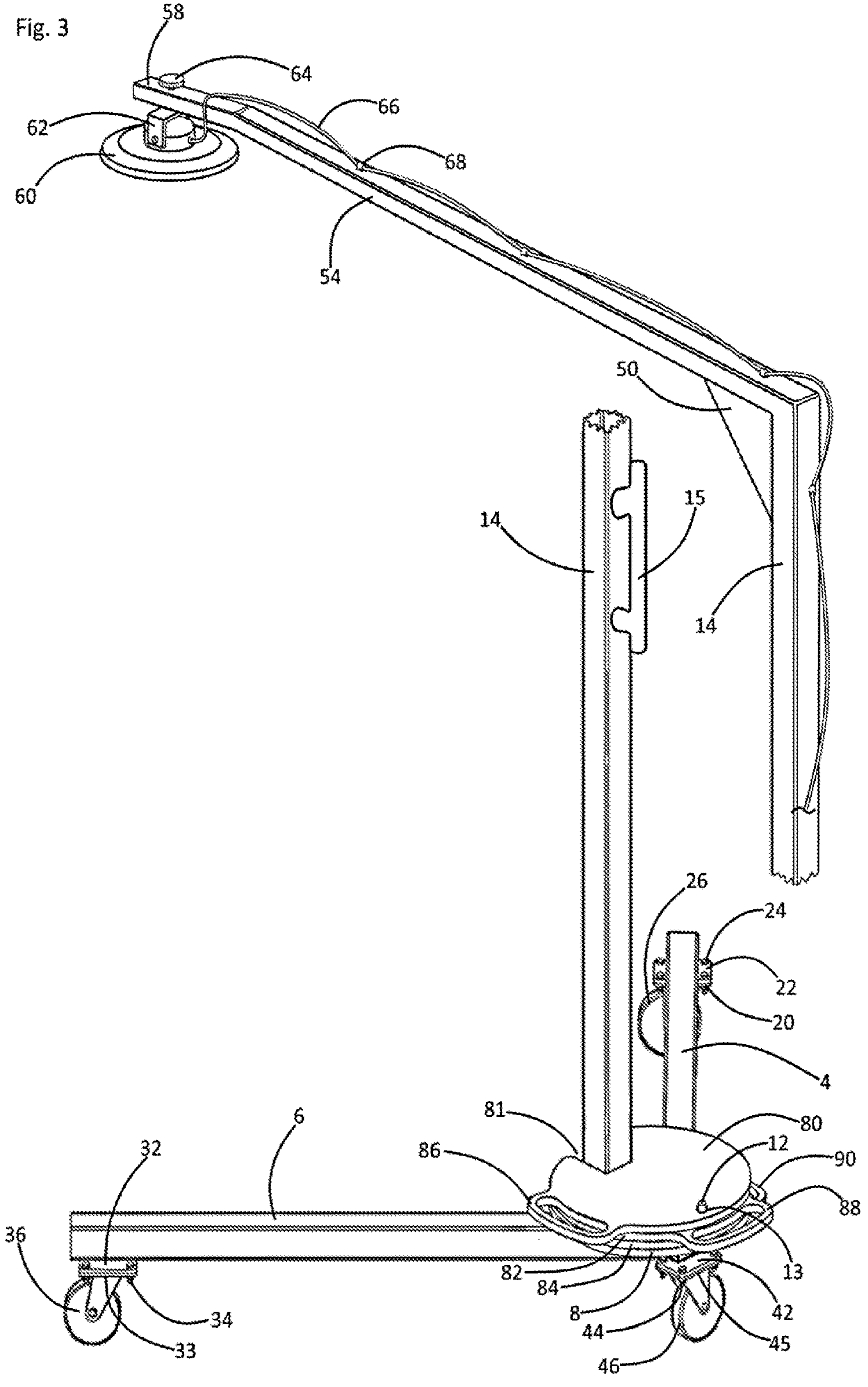
FIG. 3 is an opposite view of the structure of FIG. 1.

Referring simultaneously to FIGS. 1, 3, and 8, a cantilevering arm is incorporated within the assembly so that such arm's proximal end is fixedly attached to the upper end of the vertical column 14. In the preferred embodiment, the distal end of such arm 54 is configured to include a light leveling section 58. An electric light 60 is preferably fixedly attached to the extreme distal end of the cantilevering arm 54, 58, such light 60 incorporating illuminating elements 61 which are preferably light emitting diodes. Suitably, the illuminating element 61 may alternatively comprise incandescent bulbs, halogen bulbs, or fluorescent bulbs. The electric light 60 is preferably adjustably directed by a swivel bracket 62, and is easily mounted and disassembled by means of a provided screw attachment knob 64. An electric cord 66 supplying electric power to the light 60 extends along the cantilevering arm 54,58 and then vertically along the column 14, such electric cord 66 being attached by mounting clips 68. A cord winding bracket 15 may be fixedly attached to the vertical column 14 for convenient storage of the electric cable 66 while not in use. In the preferred embodiment, such bracket 15 includes a handle loop which allows the bracket to be utilized for manually rollably moving the assembly 1. In the preferred embodiment, a gusset plate 56 is provided for assistance in rigidly extending the cantilevering arm 54 from the vertical column 14.

Referring simultaneously to FIGS. 1, 2, and 3, a vertically stacked series of stabilization weights 80, 82, 84 is mounted upon the upper surface of support plate 8. Each weight among said series of weights is preferably configured as a plate, and the forward end of each such plate configured weight preferably has a forwardly opening column receiving slot 81. Upon stacked placements of such weights upon the support plate 8, their slots 81 receive the lower end of the column 14. Receipts of the support column 14 within the slots 81 advantageously resist any accidental leftward or rightward displacement of the stabilization plates 80, 82, 84.

In order to prevent accidental rearward displacement of the stabilization plates 80, 82, 84, a retainer pin 12 is preferably fixedly welded to the support plate 8 so that such pin extends upwardly from a rearward aspect or surface thereof. Each of the stabilization plates 80, 82, 84 preferably includes a pin receiving eye 12 which, upon stacking of the plates upon the support plate 8, and upon extensions of the retainer pin 12 through the plates' eyes 13, the pin 12 may advantageously resist any accidental rearward displacements of the stabilization plates. Such accidental displacements of the stabilization plates undesirably threaten forward toppling of the light assembly, and the inventive retainer pin 12 and eye 13 combinations advantageously lessen such risk of light toppling.

Figure 4:
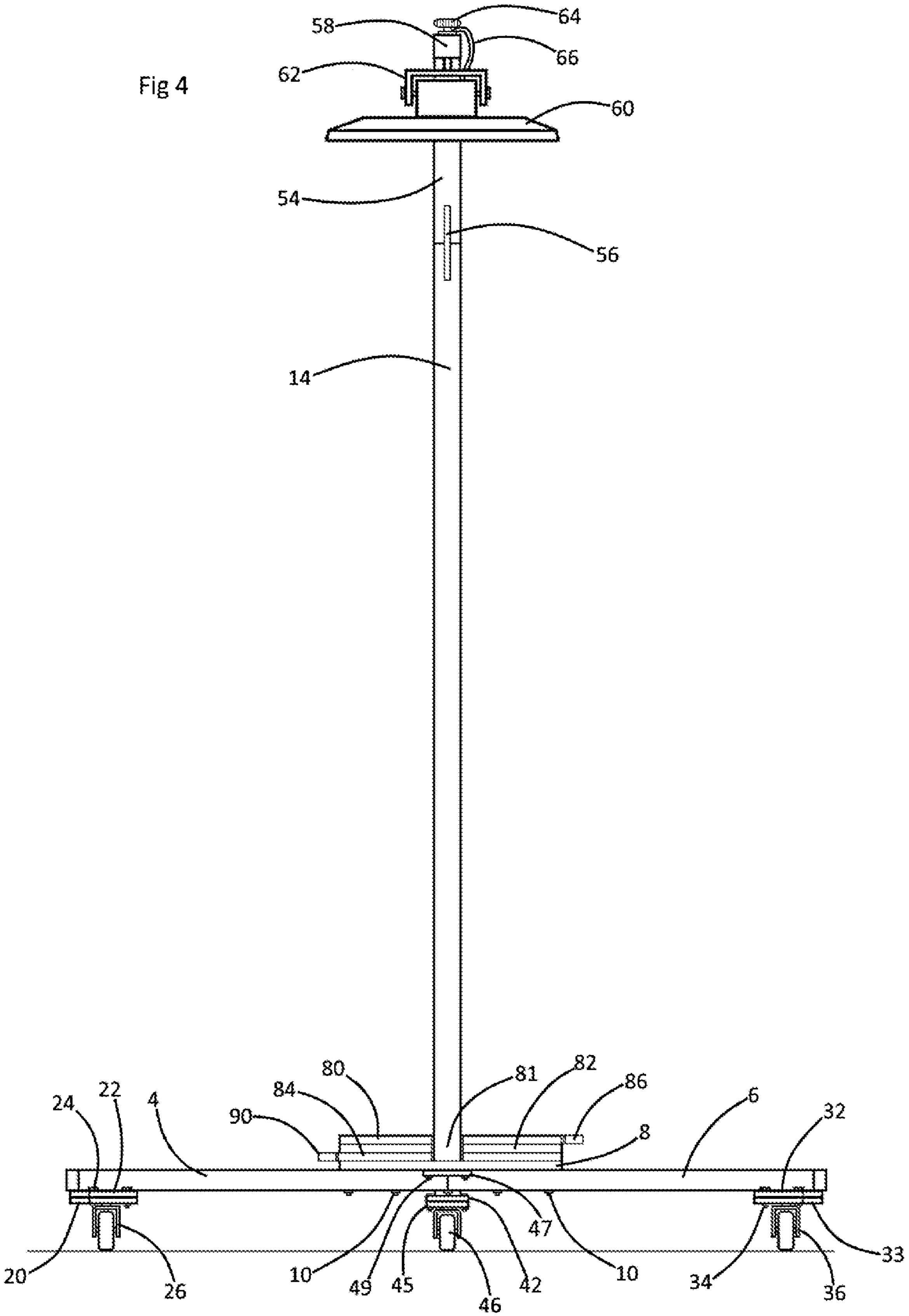
FIG. 4 is a front view of the structure of FIG. 1.

Referring to FIG. 2, it can be seen that pin 12 is positioned upon support plate 8 rearwardly from the rear wall of column 14. Such positioning preferably further orients the pin 12 so that it is displaced both rightwardly from the column's left wall and leftwardly from the column's right wall. Accordingly, an orienting line extending rearwardly and perpendicularly from the column's rear wall preferably intersects the pin 12. Referring further simultaneously to FIGS. 3 and 4, the above described orientation and position characteristics of the column 14, the column's walls, and the pin 12 are preferably reflected both in the dimensions and positions of the slots 81 which open forwardly at forward edges of the stabilization weights 80, 82, and 84 and in those weights' pin receiving eyes 13. Upon a rearward passage of the rear wall of column 14 into the slots 81, and upon abutting the rear wall of the column, with the slots rear walls, the eyes 13 vertically align with and may vertically overlie the pin 12.

Similarly with the above described relative leftward and rightward orientation of the pin 12 with respect to the left and right walls of the column 14, each eye 13 is preferably positioned both rightwardly from a left slot wall and leftwardly from a right slot wall. The left to right displacement or lateral separation of the left and right walls of the slots 81 are preferably closely fitted to the lateral dimension of the column 14 so that, upon receipts of the column 14 within the slots 81, the column's left and right walls may slidably bear against the slots' left and right walls. Such sliding contacts of the lateral wall of the slots 81 with the column's lateral walls may advantageously guide the eyes 13 of the stabilization weights 80, 82, and 84 into alignments and engagements with the pin 12 as such weights are successively and vertically stacked upon the support plate 8. Carry handles 86, 88, and 90 are preferably respectively integrally formed as components of the stabilization plates 80, 82, 84, such handles allowing the stabilization plates to be conveniently carried, stacked upon the support plate 8, or removed therefrom.

As shown in FIGS. 7 and 8, the instant inventive assembly may be conveniently and advantageously utilized with stabilization plates 22, 32, and 42 situated in direct stabilizing contact with a floor surface. Alternatively, roller caster assemblies having upper mounting plates 20, 33, and 45 may be provided, such assemblies having wheel assemblies 26, 36, and 46. Helically threaded nut and bolt combination fasteners 24, 34, and 44 may be provided for passage through and engagement with the bolt receiving eye matrixes 23, 30, and 43. Accordingly, such nut and bolt combinations securely attach the roller caster assemblies' mounting plates 20, 33, and 45 respectively to the stabilization plates 22, 32, and 42. Such mounts of the roller caster assemblies allow the entire lighting assembly 1 to be rollably moved along a flat floor surface. The cord winding bracket 15 may be advantageously dually or additionally utilized as a pull or push handle to facilitate manual movement of the assembly.

Figure 6:
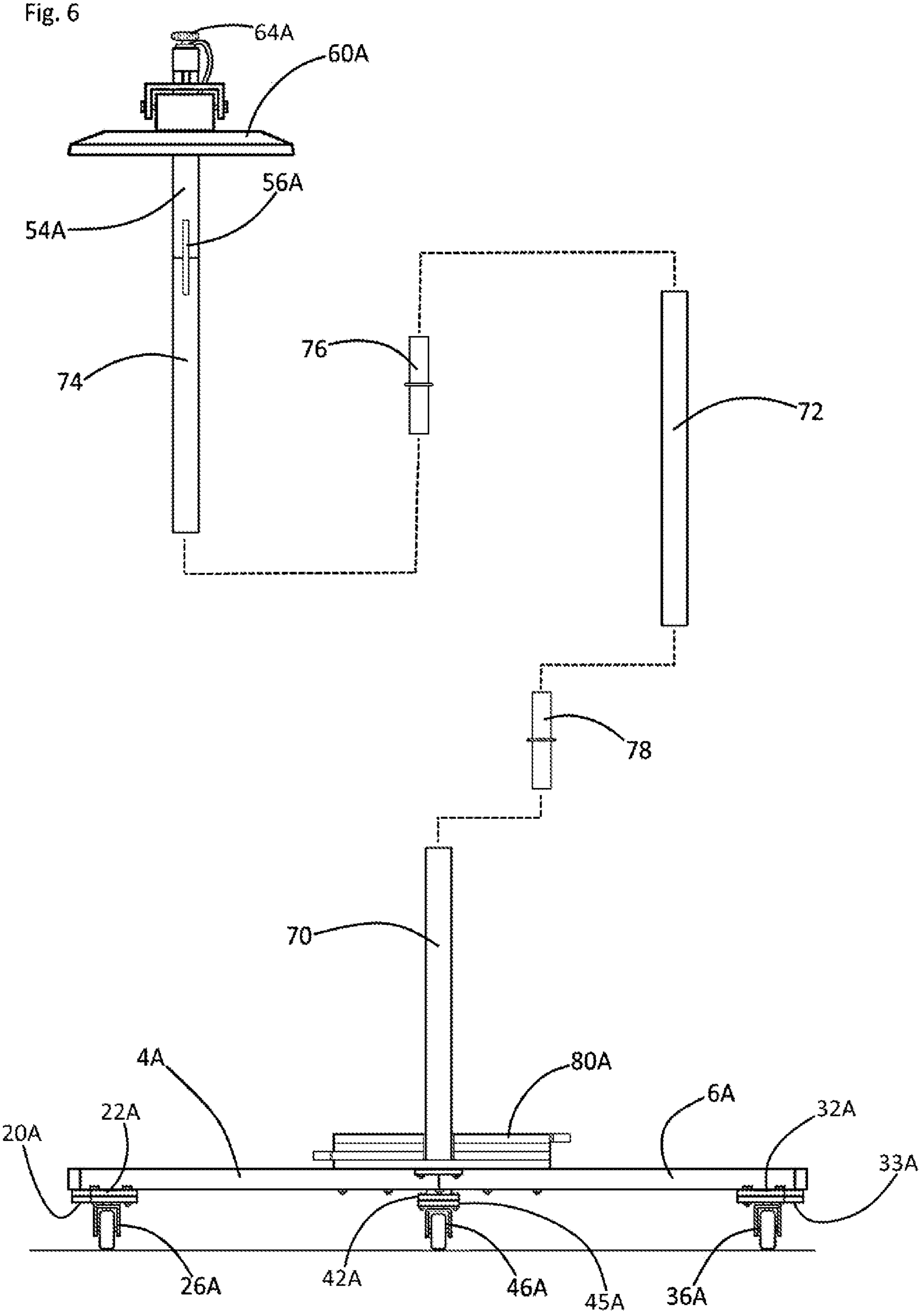
FIG. 6 presents an alternative configuration of the structure of FIG. 4, wherein a vertical column component is segmented.

Referring to the alternative configuration of FIG. 6, all structures identified by a reference numeral having a suffix "A" are configured substantially identically with similarly numbered structures appearing in other figures. In the FIG. 6 structural alternatively, the vertical column 14 of FIGS. 1 and 3 is segmented to include a lower segment 70, a medial segment 72, and an upper segment 74. Such segments may be conveniently interconnected by means of mounting pins 76 and 78 which extend upwardly and downwardly into the hollow tubular bores of such segments 72, 74, and 70. The segmentation of the vertical column advantageously promotes compactness during storage and shipping. The cantilevering arm 54, 58 may be similarly segmented and removably interconnected for purposes of compactness in storage and shipping.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention claimed is:

1. A lighting assembly comprising:

a. A "V" base having substantially horizontally extending left and right arms forming a vertex;
b. A column having a lower end, the column extending upwardly from the vertex;
c. An upper arm fixedly attached to and cantilevering forwardly from an upper end of the column;
d. An electric light fixedly attached to a forward end of the upper arm;
e. A support plate fixedly mounted over the vertex, said column end being fixedly attached to the support plate;
f. A vertical stack of stabilization weights, said stack overlying the support plate;
g. a pin fixedly attached to and extending upwardly from the support plate; and
h. A plurality eye and slot combinations, wherein each of such combinations' eyes opens at one of the stabilization weights, wherein said each combination's slot opens away from said each combination's eye, wherein said each combination's slot has a rearward end, wherein said each combination's eye has a forward end, and wherein said forward end is positioned rearwardly from said rearward end; wherein each stabilization weight has a forward edge, wherein each eye and slot combination's slot opens at one of said forward edges, said each slot receiving the column.

2. The lighting assembly of claim 1 wherein each eye and slot combination's eye extends vertically through one of the stabilization weights, said each eye receiving the pin.

3. The lighting assembly of claim 1 comprising a left stabilization plate fixedly attached to a distal end of the left arm, and further comprising a right stabilization plate fixedly attached to a distal end of the right arm.

4. The lighting assembly of claim 3 further comprising a third stabilization plate fixedly mounted below the vertex.

5. The lighting assembly of claim 4 further comprising a triple of rollers, each roller among the triple of rollers being fixedly attached to and extending downwardly from one of the stabilization plates.

6. The lighting assembly of claim 2 further comprising a plurality of handles, each handle among the plurality of handles being fixedly attached to or formed wholly with one of the stabilization weights.

7. The lighting assembly of claim 2 further comprising a cord winding bracket fixedly attached to the column.

8. The lighting assembly of claim 7 further comprising a handle loop extending from the column.

9. The lighting assembly of claim 8 wherein the cord winding bracket comprises the handle loop.

10. A lighting assembly comprising:

a. A "V" base having substantially horizontally extending left and right arms forming a vertex;
b. A column having a lower end, the column extending upwardly from the vertex;
c. An upper arm fixedly attached to and cantilevering forwardly from an upper end of the column;
d. An electric light fixedly attached to a forward end of the upper arm;
e. A support plate fixedly mounted over the vertex, said column end being fixedly attached to the support plate;
f. A vertical stack of stabilization weights, said stack overlying the support plate;
g. A pin fixedly attached to and extending upwardly from the support plate; and
h. A plurality eye and slot combinations, wherein each of such combinations' eyes opens at one of the stabilization weights, wherein said each combination's slot opens away from said each combination's eye, wherein said each combination's slot has a rearward end, wherein said each combination's eye has a forward end, and wherein said forward end is positioned rearwardly from said rearward end.

11. The lighting assembly of claim 10 wherein each eye and slot combination's slot has left and right walls adapted for slidably guiding said each combination's eye into engagement with the pin.

12. The lighting assembly of claim 11, wherein the column has a rear wall, and wherein the pin is positioned rearwardly from the column's rear wall.

* * * * *